US012719911B2

(12) United States Patent
Iwan et al.

(10) Patent No.: US 12,719,911 B2
(45) Date of Patent: Aug. 25, 2026

(54) CLUSTERING COMPLIANCE ACTIVITIES AND SECURITY VULNERABILITY REMEDIATIONS

(71) Applicant: Capital One Services, LLC, McLean, VA (US)

(72) Inventors: Grant Michael Iwan, Montpelier, VA (US); Mohamed Seck, Aubrey, TX (US); Shannon Reid, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 128 days.

(21) Appl. No.: 18/508,032

(22) Filed: Nov. 13, 2023

(65) Prior Publication Data

US 2025/0159012 A1 May 15, 2025

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01)

(58) Field of Classification Search
CPC ............................ H04L 41/16; H04L 63/1433
See application file for complete search history.

(56) References Cited

U.S. PATENT DOCUMENTS 10,402,748 B2 * 9/2019 Virkar .................... G06N 20/00
10,735,451 B1 * 8/2020 Baker ..................... H04L 63/20
2013/0325763 A1 * 12/2013 Cantor ............. G06Q 10/06312 706/12
2014/0278646 A1 * 9/2014 Adrian ........... G06Q 10/063114 705/7.15
2020/0111046 A1 * 4/2020 Ball-Marian .. G06Q 10/063116
2021/0280195 A1 * 9/2021 Srinivasan .............. G06F 3/167
2023/0086609 A1 * 3/2023 Grenet ................... G06N 20/00 700/19

(Continued)

OTHER PUBLICATIONS

Horesh, Raya, "Information Retrieval, Fusion, Completion, and Clustering for Employee Expertise Estimation", NPL 2016 "https://ieeexplore.ieee.org/abstract/document/7840746" (Year: 2016).*

(Continued)

*Primary Examiner* — Dhairya A Patel
*Assistant Examiner* — Eui H Kim
(74) *Attorney, Agent, or Firm* — Harrity & Harrity, LLP

(57) ABSTRACT

In some implementations, a compliance system may receive, from a tracking system, a set of data structures representing a set of security vulnerabilities and indicating a corresponding set of severity levels. The compliance system may determine a set of levels of effort, corresponding to remediating the set of security vulnerabilities. The compliance system may provide the set of levels of effort to a machine learning model, in order to generate a proposed change to a set of users that are responsible for remediation, and may output an indication of the proposed change. The compliance system may provide the corresponding set of severity levels and the set of levels of effort to the machine learning model in order to generate clusters for the set of security vulnerabilities. The compliance system may output, based on the clusters, an indication of which users are assigned to which security vulnerabilities.

20 Claims, 8 Drawing Sheets

(56) References Cited

U.S. PATENT DOCUMENTS

| | | | | |
|---|---|---|---|---|
| 2024/0028403 | A1* | 1/2024 | Biswas | G06Q 10/063112 |
| 2024/0127141 | A1* | 4/2024 | St. Pierre | G06Q 10/06393 |
| 2024/0211828 | A1* | 6/2024 | Iwamoto | G06Q 10/063112 |

OTHER PUBLICATIONS

Co-pending U.S. Appl. No. 18/305,095, filed Apr. 21, 2023, entitled "Compliance for Cloud-Based Applications and Computer Systems Using Machine Learning".

Co-pending U.S. Appl. No. 18/491,384, filed Oct. 20, 2023, entitled "Security Vulnerability Tracking and Resolution".

* cited by examiner

Compliance system
105b
Detect compliance activities and/or security vulnerabilities
105a
Set of data structures
Cloud provider
Tracking system
100

Compliance system

125
Indication of proposed change

Administrator device

100

CLUSTERING COMPLIANCE ACTIVITIES AND SECURITY VULNERABILITY REMEDIATIONS

BACKGROUND

Cloud-based applications may be associated with compliance activities. Compliance activities may include software updates and system refreshes, among other examples. Security vulnerabilities may arise when compliance activities are not performed. These vulnerabilities can result in downtime for the cloud-based applications.

SUMMARY

Some implementations described herein relate to a system for clustering compliance activities. The system may include one or more memories and one or more processors communicatively coupled to the one or more memories. The one or more processors may be configured to receive, from a tracking system, a set of data structures representing a set of compliance activities. The one or more processors may be configured to determine, based on the set of data structures, a set of levels of effort corresponding to the set of compliance activities. The one or more processors may be configured to classify the set of compliance activities to determine a corresponding set of severity levels. The one or more processors may be configured to provide the corresponding set of severity levels and the corresponding set of levels of effort to a machine learning model in order to generate clusters for the set of compliance activities. The one or more processors may be configured to output, based on the clusters, an indication of which users, in a set of users, are assigned to which compliance activities in the set of compliance activities.

Some implementations described herein relate to a method of clustering security vulnerabilities. The method may include receiving, from a tracking system, a set of data structures representing a set of security vulnerabilities, wherein the set of data structures indicate a corresponding set of severity levels. The method may include determining, based on the set of data structures, a set of levels of effort corresponding to remediating the set of security vulnerabilities. The method may include providing the set of levels of effort to a machine learning model in order to generate a proposed change to a set of users, wherein the set of users are responsible for remediation of the set of security vulnerabilities. The method may include outputting an indication of the proposed change to the set of users. The method may include providing the corresponding set of severity levels and the set of levels of effort to the machine learning model in order to generate clusters for the set of security vulnerabilities. The method may include outputting, based on the clusters, an indication of which users, in the set of users, are assigned to which security vulnerabilities in the set of security vulnerabilities.

Some implementations described herein relate to a non-transitory computer-readable medium that stores a set of instructions for clustering compliance activities. The set of instructions, when executed by one or more processors of a device, may cause the device to receive, from a tracking system, a set of data structures representing a set of compliance activities, wherein the set of data structures indicate a corresponding set of due dates. The set of instructions, when executed by one or more processors of the device, may cause the device to determine, based on the set of data structures, a set of levels of effort corresponding to the set of compliance activities. The set of instructions, when executed by one or more processors of the device, may cause the device to provide the set of levels of effort to a machine learning model in order to generate a proposed change to a set of users, wherein the set of users are responsible for the set of compliance activities. The set of instructions, when executed by one or more processors of the device, may cause the device to output an indication of the proposed change to the set of users. The set of instructions, when executed by one or more processors of the device, may cause the device to provide the corresponding set of due dates and the set of levels of effort to the machine learning model in order to generate clusters for the set of compliance activities. The set of instructions, when executed by one or more processors of the device, may cause the device to output, based on the clusters, an indication of which users, in the set of users, are assigned to which compliance activities in the set of compliance activities.

DETAILED DESCRIPTION

Figure 1A:
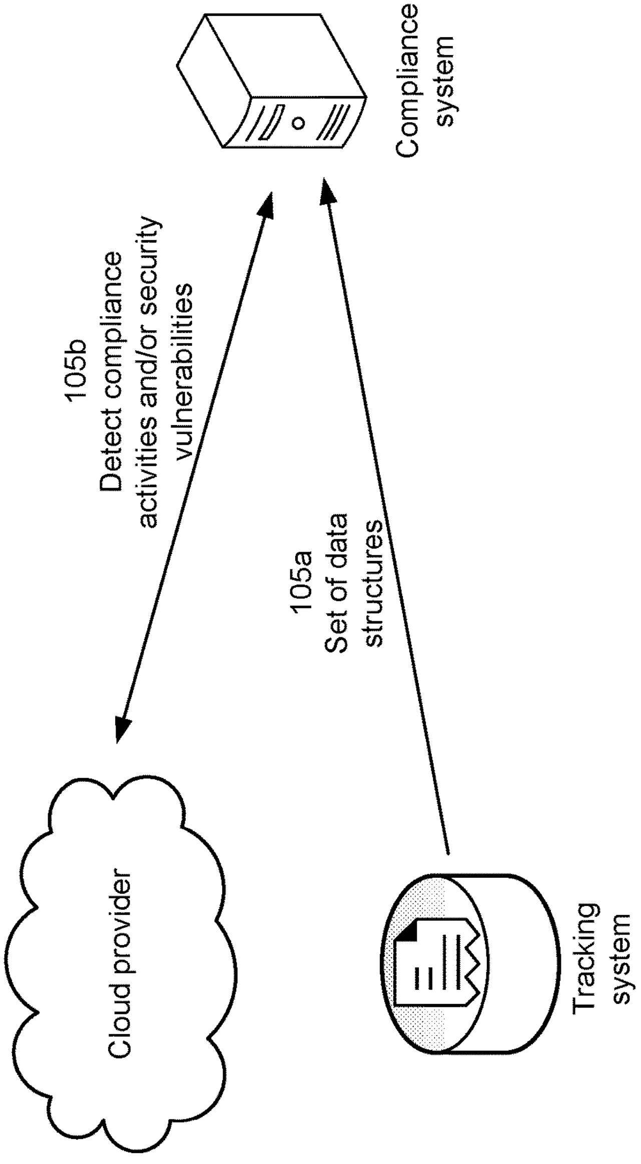
FIGS. 1A-1E are diagrams of an example implementation relating to clustering compliance activities and security vulnerability remediations, in accordance with some embodiments of the present disclosure.
Figure 1A:

The following detailed description of example implementations refers to the accompanying drawings. The same reference numbers in different drawings may identify the same or similar elements.

In some cloud environments, application services (ASVs) or other cloud-based applications may be associated with compliance activities. Compliance activities may include certification of a set of team members, rehydration of a cloud storage, updating of a software application, review of an application profile review, or registering a dataset, among other examples. Security vulnerabilities may arise when compliance activities are not performed. For example, software applications that are due for security patches or other software updates may be vulnerable to attacks, and drivers or other applications that control networked devices, at least in part, that are due for security patches or other software updates may be vulnerable to attacks.

Generally, compliance activities are assigned to users as received (e.g., in a round robin rotation or randomly). However, some compliance activities are more likely to result in security vulnerabilities than other compliance activities. Accordingly, assigning compliance activities as received reduces security by increasing chances of security vulnerabilities. Additionally, when a user has a heavy workload, an assigned compliance activity may persist. When the assigned compliance activity persists, security may be reduced (e.g., because the compliance activity being unperformed results in a security vulnerability), and memory overhead is increased because a data structure associated with the assigned compliance activity cannot be archived.

Some implementations described herein enable a machine learning model to assign compliance activities based on severity levels and levels of effort (LoEs) (e.g., how long the compliance activities are estimated to take to perform). The machine learning model therefore prioritizes compliance activities that are more likely to result in security vulnerabilities. As a result, the machine learning model increases security. Additionally, the machine learning model may use the LoEs to prevent some users from having workloads that are too heavy. As a result, memory overhead is reduced because the compliance activities will be performed faster, and thus data structures associated with the compliance activities will be archived faster.

Additionally, in some implementations, the machine learning model may predict that the set of users will be unable to complete all pending compliance activities. Accordingly, the machine learning model may generate a proposed change to the set of users. As a result, the machine learning model attempts to maximize completion of compliance activities in order to minimize security vulnerabilities. As a result, the machine learning model increases security.

FIGS. 1A-1E are diagrams of an example 100 associated with clustering compliance activities and security vulnerability remediations. As shown in FIGS. 1A-1E, example 100 includes a tracking system, a cloud provider, a compliance system, a machine learning (ML) model (e.g., provided by an ML host), an administrator device, and a set of user devices. These devices are described in more detail in connection with FIGS. 2 and 3.

As shown in FIG. 1A and by reference number 105*a*, the compliance system may detect, in coordination with the cloud provider, a set of compliance activities that are unperformed and/or a set of security vulnerabilities (e.g., associated with the set of compliance activities). In some implementations, the set of compliance activities and/or security vulnerabilities may be indicated by names (e.g., string values). Additionally, or alternatively, the set of compliance activities and/or security vulnerabilities may be associated with a corresponding set of due dates (e.g., determined by the cloud provider). Each due date may include a date or a datetime by which performance of the corresponding compliance activity (or remediation of the corresponding security vulnerability) is expected. Additionally, or alternatively, the set of compliance activities and/or security vulnerabilities may be associated with a corresponding set of severity levels (e.g., determined by the cloud provider). The severity levels may include numerical indicators (e.g., scores between 1 and 5, between 1 and 10, or in another numeric range) and/or categorical indicators (e.g., a selection between "high," "medium," and "low," among other examples).

In some implementations, the compliance system may transmit, and the cloud provider may receive, a request for the set of compliance activities and/or security vulnerabilities. For example, the request may include a hypertext transfer protocol (HTTP) request and/or an application programming interface (API) call, among other examples. The request may include (e.g., in a header and/or as an argument) an indication of a cloud-based application (e.g., one or more indications of one or more cloud-based applications) associated with the set of compliance activities and/or security vulnerabilities. Accordingly, the cloud provider may transmit an indication of the set of compliance activities and/or security vulnerabilities in response to the request. The compliance system may transmit the request according to a schedule (e.g., once per hour or once per day, among other examples) and/or in response to a command to transmit the request. For example, the administrator device may transmit, and the compliance system may receive, the command, such that the compliance system transmits the request in response to the command.

Additionally, or alternatively, the compliance system may subscribe to compliance activity and/or security vulnerability updates from the cloud provider. Accordingly, the cloud provider may transmit an indication of new compliance activities and/or security vulnerabilities according to a schedule (e.g., once per hour or once per day, among other examples) and/or as available (e.g., shortly after a new compliance activity is added or a new security vulnerability is detected).

Additionally, or alternatively, as shown by reference number 105*b*, the tracking system may transmit, and the compliance system may receive, a set of data structures representing the set of compliance activities and/or security vulnerabilities. In some implementations, the set of data structures may represent tickets that are generated in response to non-performance of the compliance activities (e.g., automatically or by an administrator) and/or detection of the security vulnerabilities (e.g., automatically or by an administrator). Alternatively, the tickets may be generated as reminders to complete the compliance activities (e.g., automatically or by the administrator) and/or reminders to remediate the security vulnerabilities (e.g., automatically or by an administrator). The set of data structures may, in some implementations, indicate a corresponding set of due dates and/or a corresponding set of severity levels (e.g., as described above in connection with reference number 105*a*).

In some implementations, the compliance system may transmit, and the tracking system may receive, a request for the set of data structures. For example, the request may include an HTTP request and/or an API call, among other examples. The request may include (e.g., in a header and/or as an argument) an indication of a cloud-based application (e.g., one or more indications of one or more cloud-based applications) associated with the set of compliance activities and/or security vulnerabilities. Accordingly, the tracking system may transmit the set of data structures in response to the request. The compliance system may transmit the request according to a schedule (e.g., once per hour or once per day, among other examples) and/or in response to a command to transmit the request. For example, the administrator device may transmit, and the compliance system may receive, the command, such that the compliance system transmits the request in response to the command.

Additionally, or alternatively, the compliance system may subscribe to ticket updates from the tracking system. Accordingly, the tracking system may transmit the set of data structures according to a schedule (e.g., once per hour or once per day, among other examples) and/or as available (e.g., shortly after new tickets are created).

Although the example 100 is shown with the cloud provider and the tracking system, other examples may include an intermediary system (e.g., one or more intermediary devices) that receive and process information from the cloud provider and/or the tracking system. Accordingly, the compliance system may receive the indication of the set of compliance activities and/or security vulnerabilities (and/or the set of data structures) from the intermediary system. Additionally, or alternatively, the intermediary system may generate (or at least update) the set of data structures (e.g., based on the information received from the cloud provider and/or the tracking system). Accordingly, the compliance system may receive the set of data structures (or an updated set of data structures) from the intermediary system.

Figure 1B:
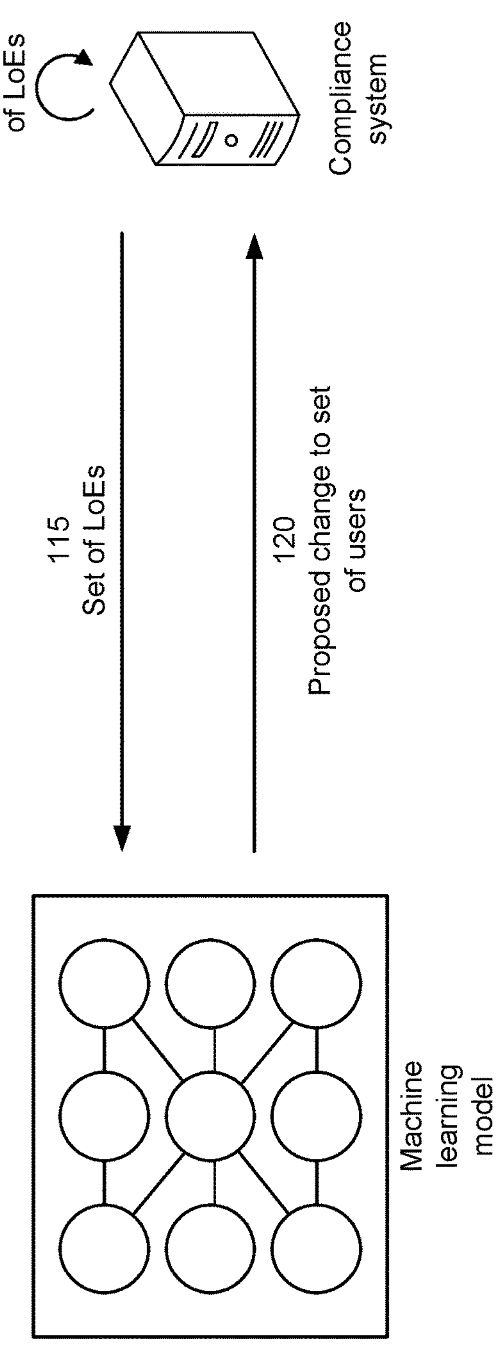
Figure 1B:

As shown in FIG. 1B and by reference number 110, the compliance system may estimate a set of LoEs corresponding to the set of compliance activities and/or security vulnerabilities. The set of LoEs may be a set of amounts of time (e.g., for performing the set of compliance activities and/or remediating the set of security vulnerabilities). The compliance system may determine the set of LoEs based on the set of data structures. In some implementations, the compliance system may apply a model to determine the LoEs. For example, the compliance system may input the set of data structures (or information extracted from the set of data structures) to the model and receive an indication of the set of LoEs from the model.

In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the compliance system may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar data structures in the set of data structures together. Accordingly, the compliance system may estimate an LoE, in the set of LoEs, corresponding to each group of data structures output by the clustering model.

Additionally, or alternatively, to estimate the set of LoEs, the compliance system may map each compliance activity (or security vulnerability) to a corresponding sequence of events. The corresponding sequence of events may be included in a log, associated with historical compliance activities. The compliance system may identify the log to use for a compliance activity (or security vulnerability) based on similar names (e.g., a matching proportion of characters that satisfies a matching threshold, among other fuzzy matching techniques) associated with the log and the compliance activity (or security vulnerability). In another example, the compliance system may use a clustering model, as described above, to determine the log (or logs) that are similar to the compliance activity (or security vulnerability). Therefore, the compliance system may determine, for each compliance activity (or security vulnerability), a corresponding LoE based on the corresponding sequence of events (in the similar log).

As shown by reference number 115, the compliance system may provide, to a machine learning model, the set of LoEs. The machine learning model may be trained (e.g., by the ML host and/or a device at least partially separate from the ML host) using a dataset associated with a set of users (who are responsible for the set of compliance activities and/or security vulnerabilities). Accordingly, the machine learning model may be configured to determine whether the set of users is able to perform the set of compliance activities (and/or remediate the set of security vulnerabilities). The machine learning model may be the same model as is described above and is used to estimate the set of LoEs. Alternatively, a model ensemble may include one machine learning model that determines the set of LoEs and another machine learning model that determines whether the set of users will be able to complete the set of compliance activities and/or security vulnerabilities. Alternatively, the machine learning model that determines the set of LoEs may be fully separate (e.g., separately trained and/or separately deployed) from the machine learning model that determines whether the set of users will be able to complete the set of compliance activities and/or security vulnerabilities.

As shown by reference number 120, the machine learning model may output, and the compliance system may receive, an indication of a proposed change to the set of users. For example, the indication may include a difference between expected man hours and actual man hours associated with performing the set of compliance activities (and/or remediating the set of security vulnerabilities). Additionally, or alternatively, the indication may include a staffing estimate (e.g., a difference between a number of persons in the set of users and a number of persons required to complete the set of compliance activities and/or security vulnerabilities).

Figure 1C:
Figure 1C:
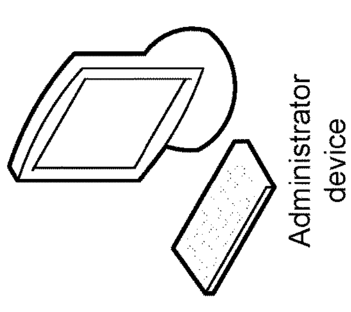

As shown in FIG. 1C and by reference number 125, the compliance system may transmit, and the administrator device may receive, the indication of the proposed change. The indication may be included in an email message, a text message, and/or a push notification, among other examples. By determining the proposed change to the set of users, the machine learning model attempts to maximize completion of compliance activities (and/or remediation of security vulnerabilities). As a result, security is increased because security vulnerabilities are less likely to arise (e.g., because the set of compliance activities are performed) and/or because security vulnerabilities are less likely to persist (e.g., because the set of security vulnerabilities are remediated).

Figure 1D:
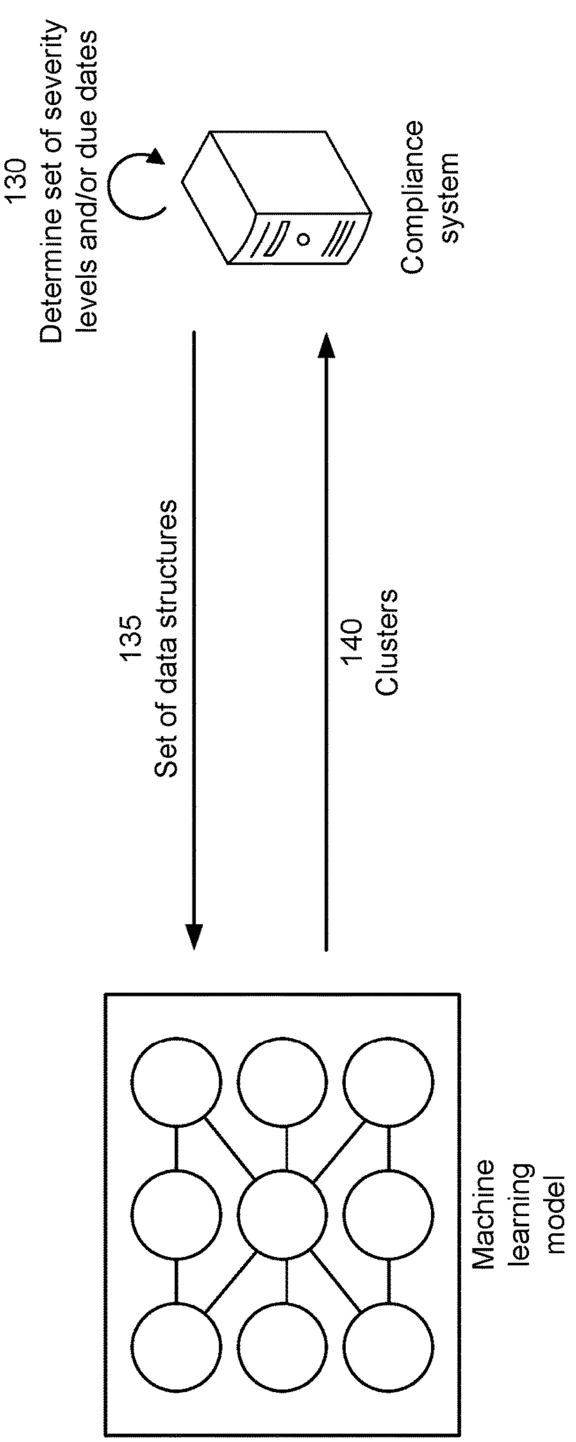
Figure 1D:

Additionally with, or alternatively to, determining the set of LoEs, the compliance system may determine a corresponding set of due dates and/or a corresponding set of severity levels for the set of security vulnerabilities, as shown in FIG. 1D and by reference number 130. In some implementations, the compliance system may apply a set of rules that attaches due dates (e.g., 5 days from a current datetime, 1 week from a current datetime, 25 days from a current datetime, or 1 month from a current datetime, among other examples) to particular types of compliance activities (and/or security vulnerabilities). For example, the set of rules may accept, as input, names (e.g., indicated in the set of data structures) associated with the set of compliance activities (and/or security vulnerabilities) and may provide the corresponding set of due dates as output.

In some implementations, the compliance system may classify the set of compliance activities (and/or security vulnerabilities) to determine the corresponding set of severity levels. For example, the compliance system may apply a clustering model (e.g., as described above) to the set of data structures and label the clusters output by the clustering model in order to determine the corresponding set of severity levels based on the labels.

As shown by reference number 135, the compliance system may provide, to a machine learning model, the set of data structures. The machine learning model may be trained (e.g., by the ML host and/or a device at least partially separate from the ML host) using a dataset associated with compliance activities and/or security vulnerabilities. Accordingly, the machine learning model may be configured to allocate the set of compliance activities (and/or security vulnerabilities) based on priority. For example, the machine learning model may use the corresponding set of due dates and/or the corresponding set of severity levels (whether indicated in the set of data structures and/or determined by the compliance system and provided to the machine learning model). Additionally, or alternatively, the machine learning model may use the corresponding set of LoEs. The machine learning model may be the same model as is described above and is used to estimate the set of LoEs. Alternatively, a model ensemble may include one machine learning model that determines the set of LoEs and another machine learning model that assigns the compliance activities (and/or security vulnerabilities). Alternatively, the machine learning model that determines the set of LoEs may be fully separate (e.g., separately trained and/or separately deployed) from the machine learning model that assigns the compliance activities (and/or security vulnerabilities).

In some implementations, the machine learning model may cluster the set of compliance activities (and/or security vulnerabilities). For example, the machine learning model may generate the clusters based on the corresponding set of due dates, the corresponding set of severity levels, and/or the corresponding set of LoEs. In some implementations, the machine learning model may have been trained (e.g., by the ML host and/or a device at least partially separate from the ML host) on unlabeled data. For example, the machine learning model may be unsupervised. Accordingly, the clusters may be unlabeled. Alternatively, the machine learning model may have been trained (e.g., by the ML host and/or a device at least partially separate from the ML host) on labeled data. For example, the machine learning model may be supervised. Accordingly, the clusters may be labeled.

As shown by reference number 140, the machine learning model may output, and the compliance system may receive, an indication of the clusters. For example, as described above, each cluster may be associated with a label and may include a subset of the compliance activities (and/or security vulnerabilities). Alternatively, each cluster may be unlabeled and may include a subset of the compliance activities (and/or security vulnerabilities). Each cluster may form a group of the compliance activities (and/or security vulnerabilities) that should be assigned to a single user. For example, each cluster may include a combination of elements associated with higher severity levels and elements associated with lower severity levels and/or a combination of elements associated with larger LoEs and elements associated with smaller LoEs. Alternatively, each cluster may include compliance activities (and/or security vulnerabilities) associated with similar severity levels and/or LoEs such that each user, in the set of users, will be assigned a combination of compliance activities (and/or security vulnerabilities) across different clusters.

Figure 1E:
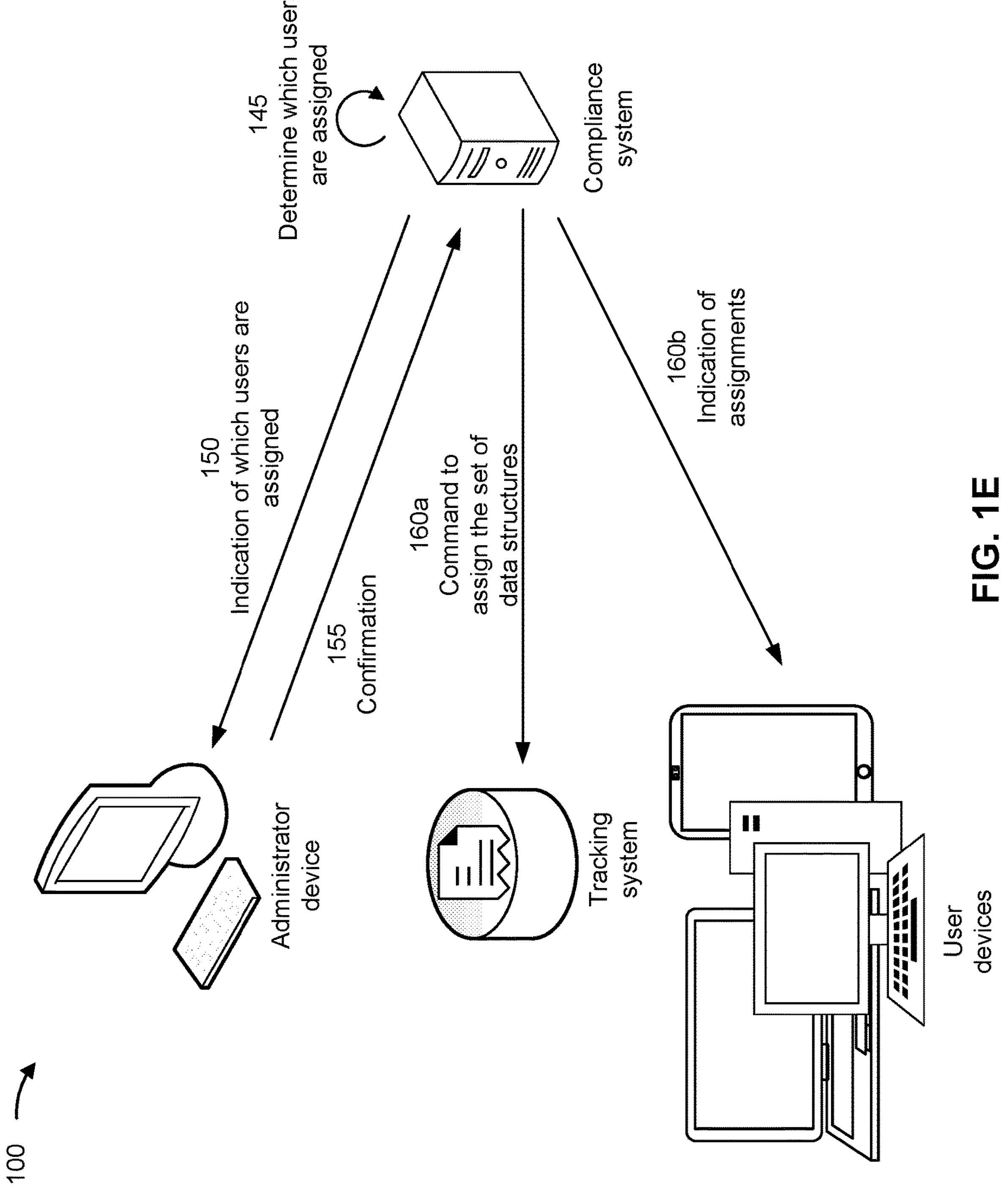

As shown in FIG. 1E and by reference number 145, the compliance system may determine which users, in the set of users, are assigned to which compliance activities in the set of compliance activities (and/or to which security vulnerabilities in the set of security vulnerabilities). In one example, the compliance system may identify clusters for the set of users and may map the clusters for the set of users to the clusters for the set of compliance activities (and/or security vulnerabilities). Therefore, the compliance system may determine which compliance activities (and/or security vulnerabilities) are assigned to which user based on which clusters are mapped together.

In some implementations, the compliance system may receive (e.g., from a repository, whether local to the compliance system or at least partially separate from the compliance system) skill information indicating expertises (e.g., one or more expertises) corresponding to each user in the set of users. For example, the compliance system may transmit, and the repository may receive, a request for the expertises. For example, the request may include an HTTP request and/or an API call, among other examples. The request may include (e.g., in a header and/or as an argument) an indication of the set of users. Accordingly, the repository may transmit the skill information in response to the request. The compliance system may use the skill information to determine which users, in the set of users, are assigned to which compliance activities in the set of compliance activities (and/or to which security vulnerabilities in the set of security vulnerabilities). For example, the compliance system may cluster the set of users by expertise and assign, to each user, compliance activities (and/or security vulnerabilities) that are in a cluster that is closest (in a multi-dimensional encoding space for the clusters) to the cluster including the user.

Additionally, or alternatively, the compliance system may receive (e.g., from a repository, whether local to the compliance system or at least partially separate from the compliance system) schedule information associated with the set of users. For example, the compliance system may transmit, and the repository may receive, a request for the schedule information. For example, the request may include an HTTP request and/or an API call, among other examples. The request may include (e.g., in a header and/or as an argument) an indication of the set of users. Accordingly, the repository may transmit the schedule information in response to the request. The compliance system may use the schedule information to determine which users, in the set of users, are assigned to which compliance activities in the set of compliance activities (and/or to which security vulnerabilities in the set of security vulnerabilities). For example, the compliance system may refrain from assigning compliance activities (and/or security vulnerabilities) associated with higher severity levels to users that are likely to be absent soon and/or to users that are already assigned a significant quantity of tasks.

By using the machine learning model to assign the compliance activities (and/or security vulnerabilities), the compliance system increases security by reducing security vulnerabilities. Additionally, the compliance system prevents some users from having workloads that are too heavy. As a result, memory overhead is reduced because the compliance activities will be performed faster (and/or the security vulnerabilities will be remediated faster), and thus the set of data structures will be archived faster.

As shown by reference number 150, the compliance system may transmit, and the administrator device may receive, an indication of which users, in a set of users, are assigned to which compliance activities in the set of compliance activities (and/or to which security vulnerabilities in the set of security vulnerabilities). The indication may be included in an email message, a text message, and/or a push notification, among other examples.

As shown by reference number 155, the administrator device may transmit, and the compliance system may receive, a confirmation of which users are assigned to which compliance activities (and/or security vulnerabilities). For example, a user of the administrator device (e.g., an administrator associated with the set of compliance activities and/or security vulnerabilities) may interact with an input component of the administrator device in order to trigger the administrator device to transmit the confirmation.

As shown by reference number 160*a*, the compliance system may transmit, and the tracking system may receive, a command to assign the set of data structures based on which users are assigned to which compliance activities (and/or security vulnerabilities). For example, the compliance system may transmit the command in response to the confirmation from the administrator device. Alternatively, the compliance system may automatically transmit the command in response to receiving, from the machine learning model, the indication of which users are assigned to which compliance activities (and/or security vulnerabilities).

Therefore, the ticket system may notify the set of users about the set of tickets. In some implementations, the ticket system may identify the set of user devices associated with the set of users. For example, a data structure may map identifiers of users (e.g., names, usernames, and/or email addresses, among other examples) to identifiers of user devices (e.g., machine names, Internet protocol (IP) addresses, and/or medium access control (MAC) addresses, among other examples). Therefore, the ticket system may transmit notifications to the set of user devices. Alternatively, the ticket system may identify a set of email addresses and/or telephone numbers associated with the set of users, such that the notifications are included in email messages and/or text messages.

Additionally, or alternatively, as shown by reference number 160*b*, the compliance system may notify the set of users about which compliance activities (and/or security vulnerabilities) are assigned to whom. For example, the compliance system may map identifiers of users to identifiers of user devices and may transmit notifications to the set of user devices.

By using techniques as described in connection with FIGS. 1A-1E, the compliance system uses machine learning to assign the set of compliance activities (and/or security vulnerabilities) based on the set of due dates, the set of severity levels, and/or the set of LoEs. The compliance system thus prioritizes compliance activities that are more likely to result in security vulnerabilities and increases security. Additionally, the compliance system may prevent each user, in the set of users, from having too heavy of a workload. As a result, memory overhead is reduced because the compliance activities will be performed faster (and/or the security vulnerabilities will be remediated faster), and thus the set of data structures will be archived faster.

As indicated above, FIGS. 1A-1E are provided as an example. Other examples may differ from what is described with regard to FIGS. 1A-1E.

Figure 2:
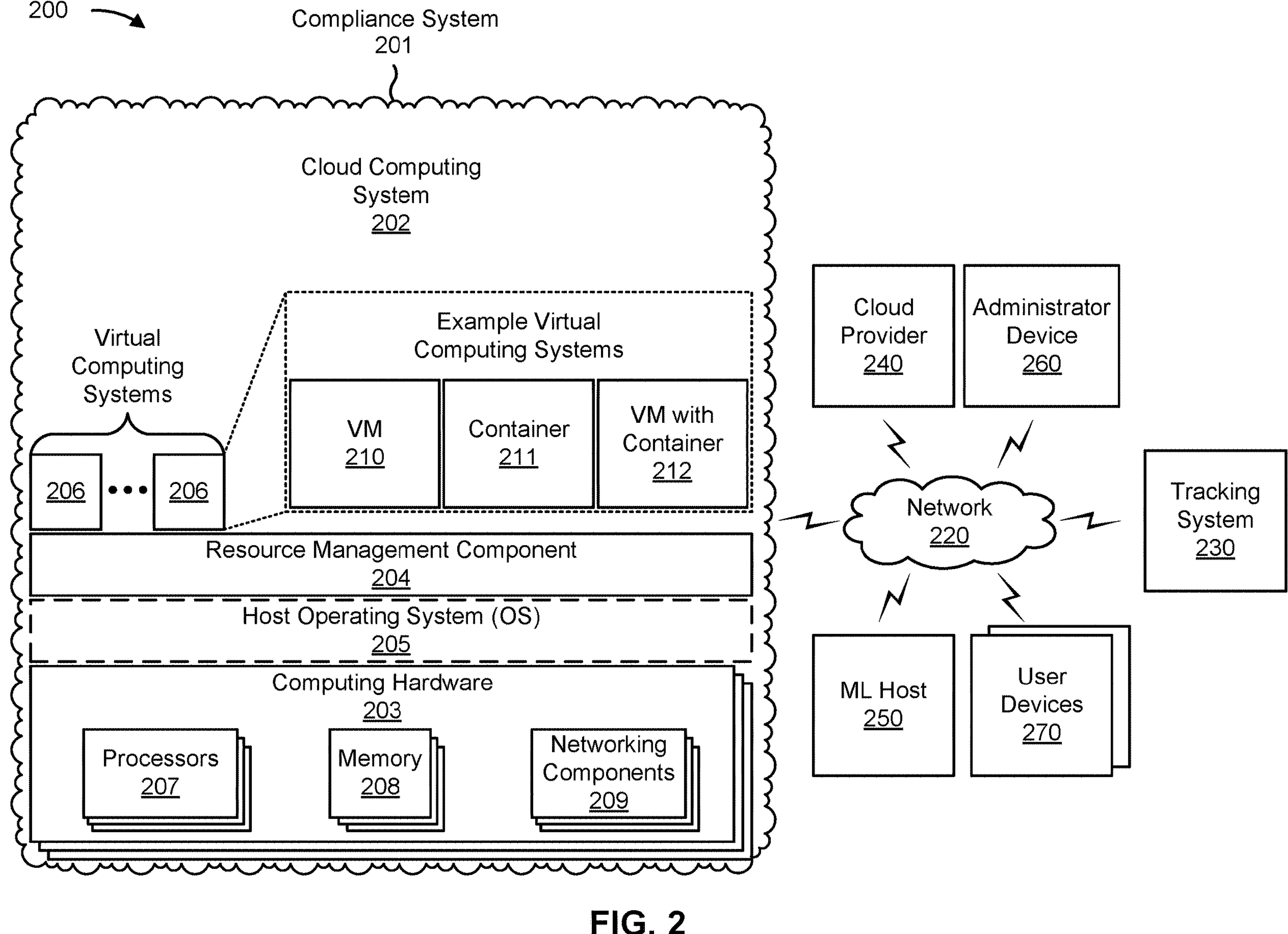
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a compliance system 201, which may include one or more elements of and/or may execute within a cloud computing system 202. The cloud computing system 202 may include one or more elements 203-212, as described in more detail below. As further shown in FIG. 2, environment 200 may include a network 220, a tracking system 230, a cloud provider 240, an ML host 250, an administrator device 260, and/or a set of user devices 270. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the compliance system 201 may include one or more elements 203-212 of the cloud computing system 202, may execute within the cloud computing system 202, and/or may be hosted within the cloud computing system 202, in some implementations, the compliance system 201 may not be cloud-based (e.g., may be implemented outside of a cloud computing system) or may be partially cloud-based. For example, the compliance system 201 may include one or more devices that are not part of the cloud computing system 202, such as device 300 of FIG. 3, which may include a standalone server or another type of computing device. The compliance system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The tracking system 230 may include one or more devices capable of receiving, generating, storing, processing, and/or providing information associated with tickets associated with compliance activities and/or security vulnerabilities, as described elsewhere herein. The tracking system 230 may include a communication device and/or a computing device. For example, the tracking system 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The tracking system 230 may include an issue tracking system, such as Jira® or Bugzilla®, among other examples. The tracking system 230 may communicate with one or more other devices of environment 200, as described elsewhere herein.

The cloud provider 240 may include one or more devices capable of receiving, generating, storing, processing, providing, and/or routing information associated with cloud-based applications, as described elsewhere herein. The cloud provider 240 may include computing hardware used in a cloud computing environment. Additionally, or alternatively, the cloud provider 240 may include one or more devices that are not part of a cloud computing system, such as device 300 of FIG. 3, which may include a standalone server or another type of computing device. For example, the cloud provider 240 may include a server, such as an application server, a client server, a web server, a database server, a host server, a proxy server, a virtual server (e.g., executing on computing hardware), or a server in a cloud computing system. The cloud provider 240 may communicate with one or more other devices of environment 200, as described elsewhere herein.

The ML host 250 may include one or more devices capable of receiving, generating, storing, processing, and/or providing information associated with machine learning models, as described elsewhere herein. The ML host 250 may include a communication device and/or a computing device. For example, the ML host 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 250 may communicate with one or more other devices of environment 200, as described elsewhere herein.

The administrator device 260 may include one or more devices capable of receiving, generating, storing, processing, and/or providing information associated with assignment of compliance activities and/or security vulnerabilities, as described elsewhere herein. The administrator device 260 may include a communication device and/or a computing device. For example, the administrator device 260 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 260 may communicate with one or more other devices of environment 200, as described elsewhere herein.

The set of user devices 270 may include one or more devices capable of receiving, generating, storing, processing, and/or providing information associated with assignment of compliance activities and/or security vulnerabilities, as described elsewhere herein. The set of user devices 270 may include one or more communication devices and/or computing devices. For example, the set of user devices 270 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The set of user devices 270 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
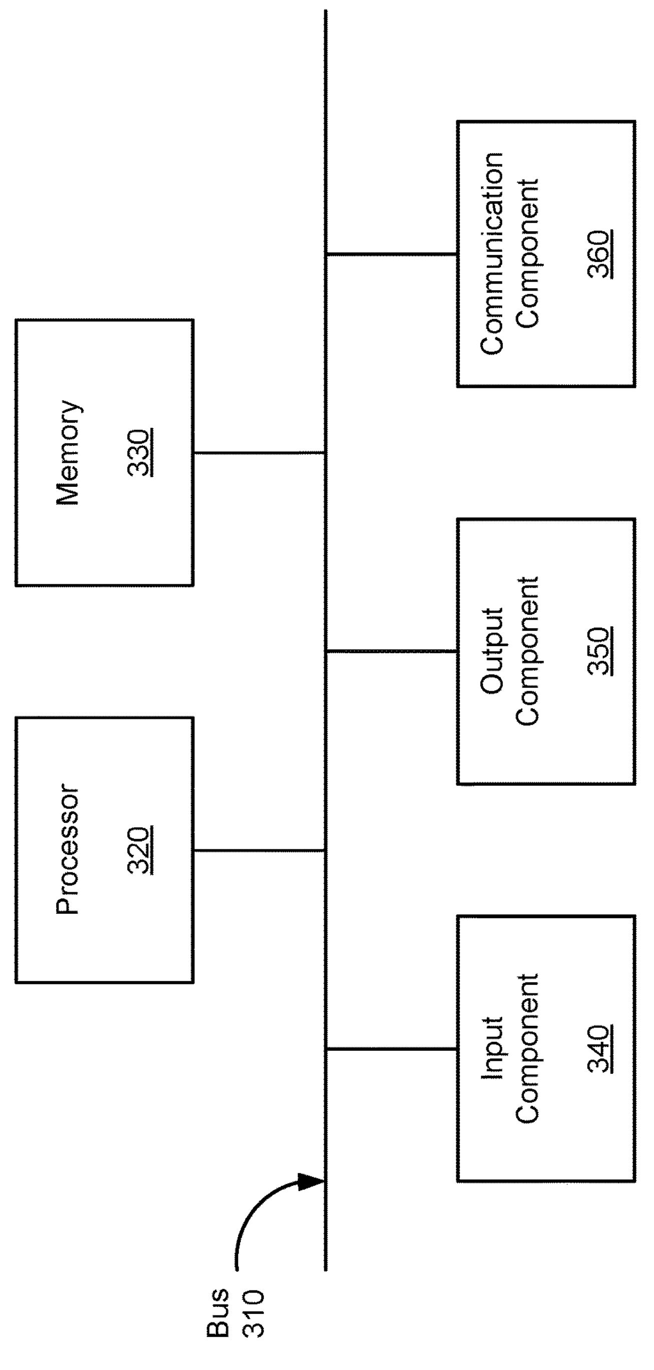
FIG. 3 is a diagram of example components of one or more devices of FIG. 2, in accordance with some embodiments of the present disclosure.

FIG. 3 is a diagram of example components of a device 300 associated with clustering compliance activities and security vulnerability remediations. The device 300 may correspond to a tracking system 230, a cloud provider 240, an ML host 250, an administrator device 260, and/or a user device 270. In some implementations, a tracking system 230, a cloud provider 240, an ML host 250, an administrator device 260, and/or a user device 270 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
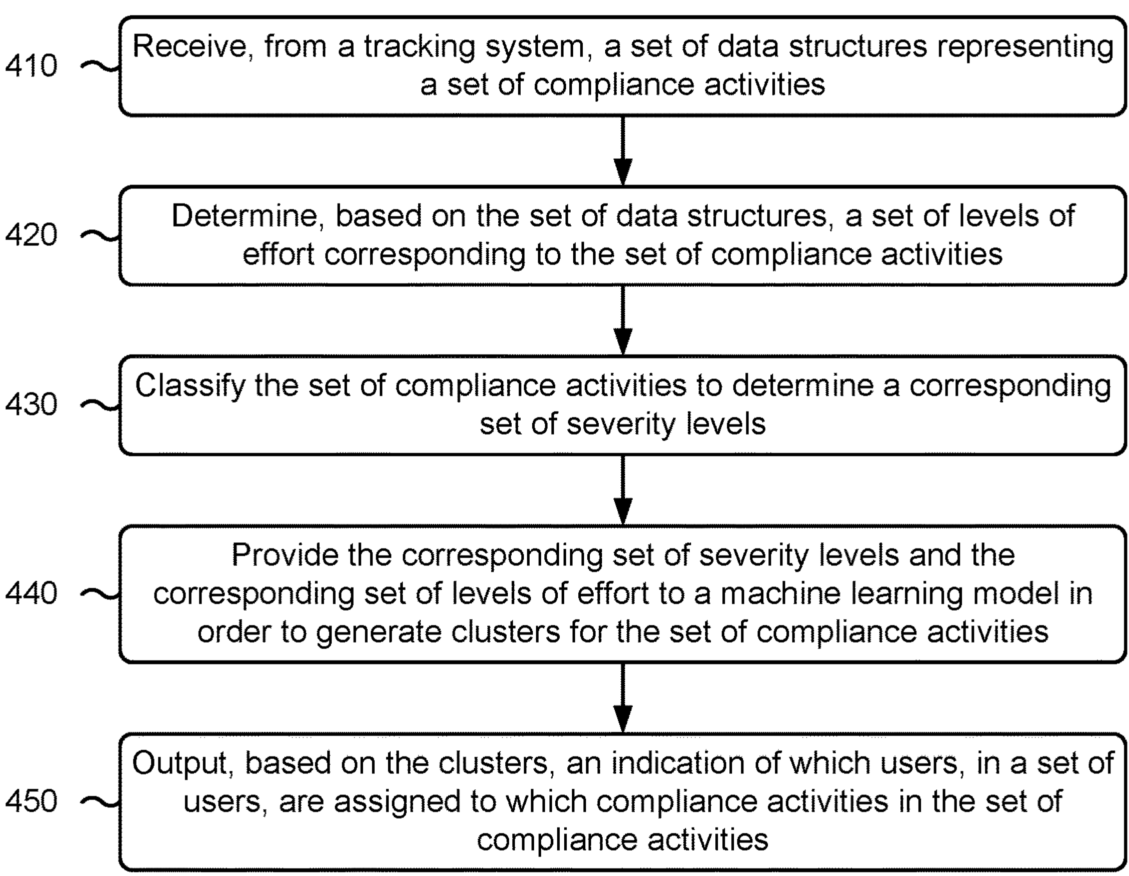
FIG. 4 is a flowchart of an example process relating to clustering compliance activities and security vulnerability remediations, in accordance with some embodiments of the present disclosure.

FIG. 4 is a flowchart of an example process 400 associated with clustering compliance activities and security vulnerability remediations. In some implementations, one or more process blocks of FIG. 4 may be performed by a compliance system 201. In some implementations, one or more process blocks of FIG. 4 may be performed by another device or a group of devices separate from or including the compliance system 201, such as a tracking system 230, a cloud provider 240, an ML host 250, an administrator device 260, and/or a user device 270. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a tracking system, a set of data structures representing a set of compliance activities (block 410). For example, the compliance system 201 (e.g., using processor 320, memory 330, input component 340, and/or communication component 360) may receive, from a tracking system, a set of data structures representing a set of compliance activities, as described above in connection with reference number 105*a* of FIG. 1A. As an example, the compliance system 201 may transmit (e.g., to the tracking system) a request for the set of data structures, and the compliance system 201 may receive (e.g., from the tracking system) the set of data structures in response to the request. For example, the request may include an HTTP request and/or an API call, among other examples. The request may include (e.g., in a header and/or as an argument) an indication of a cloud-based application associated with the set of compliance activities.

As further shown in FIG. 4, process 400 may include determining, based on the set of data structures, a set of levels of effort corresponding to the set of compliance activities (block 420). For example, the compliance system 201 (e.g., using processor 320 and/or memory 330) may determine, based on the set of data structures, a set of levels of effort corresponding to the set of compliance activities, as described above in connection with reference number 110 of FIG. 1B. As an example, the compliance system 201 may map each compliance activity to a corresponding sequence of events included in a log associated with historical compliance activities. Therefore, the compliance system 201 may determine, for each compliance activity, a corresponding LoE based on the corresponding sequence of events (in the log).

As further shown in FIG. 4, process 400 may include classifying the set of compliance activities to determine a corresponding set of severity levels (block 430). For example, the compliance system 201 (e.g., using processor 320 and/or memory 330) may classify the set of compliance activities to determine a corresponding set of severity levels, as described above in connection with reference number 130 of FIG. 1D. As an example, the compliance system 201 may apply a set of rules that attaches due dates to particular types of compliance activities. For example, the set of rules may accept, as input, names (e.g., indicated in the set of data structures) associated with the set of compliance activities and may provide the corresponding set of due dates as output.

As further shown in FIG. 4, process 400 may include providing the corresponding set of severity levels and the corresponding set of levels of effort to a machine learning model in order to generate clusters for the set of compliance activities (block 440). For example, the compliance system 201 (e.g., using processor 320 and/or memory 330) may provide the corresponding set of severity levels and the corresponding set of levels of effort to a machine learning model in order to generate clusters for the set of compliance activities, as described above in connection with reference numbers 135 and 140 of FIG. 1D. As an example, the machine learning model may cluster compliance activities based on a corresponding set of due dates, the corresponding set of severity levels, and/or the corresponding set of levels of effort.

As further shown in FIG. 4, process 400 may include outputting, based on the clusters, an indication of which users, in a set of users, are assigned to which compliance activities in the set of compliance activities (block 450). For example, the compliance system 201 (e.g., using processor 320, memory 330, and/or output component 350) may output, based on the clusters, an indication of which users, in a set of users, are assigned to which compliance activities in the set of compliance activities, as described above in connection with reference number 150 of FIG. 1E. As an example, the compliance system 201 may map clusters for the set of users to the clusters for the set of compliance activities. Therefore, the compliance system 201 may determine which compliance activities are assigned to which user based on which clusters are mapped together.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for clustering compliance activities, the system comprising:

one or more memories; and one or more processors, communicatively coupled to the one or more memories, configured to:

receive, from a tracking system, a set of data structures representing a set of compliance activities;

determine, based on mapping each compliance activity, in the set of compliance activities, to a corresponding sequence of events of a plurality of sequences of events included in one or more logs, a set of levels of effort corresponding to the set of compliance activities, wherein the system uses a similarity technique to determine the one or more logs that are associated with the set of compliance activities;

classify the set of compliance activities to determine a corresponding set of severity levels;

provide the set of levels of effort and the corresponding set of severity levels to a machine learning model in order to generate clusters for the set of compliance activities;

receive, from one or more repositories, over a network, individual skill information indicating expertises corresponding to each user in the set of users;

assign, to each user in the set of users, based on the individual skill information, compliance activities that are in a cluster, of the clusters for the set of compliance activities, that is closest in a multi- dimensional encoding space to a cluster, of clusters for the set of users;

output, based on the clusters for the set of compliance activities, an indication of which users, in the set of users, are assigned to which compliance activities in the set of compliance activities; and transmit, to the tracking system, a command to assign the set of data structures based on which users, in the set of users, are assigned to which compliance activities in the set of compliance activities.

2. The system of claim 1, wherein the one or more processors are further configured to:

receive schedule information associated with each user in the set of users, wherein the indication of which users, in the set of users, are assigned to which compliance activities, in the set of compliance activities, is further based on the schedule information.

3. The system of claim 1, wherein the set of data structures indicate a corresponding set of due dates, and wherein the clusters for the set of compliance activities are further based on providing the corresponding set of due dates to the machine learning model.

4. The system of claim 1, wherein the clusters for the set of compliance activities are unlabeled based on the machine learning model being unsupervised.

5. The system of claim 1, wherein the clusters for the set of compliance activities are labeled based on the machine learning model being supervised.

6. The system of claim 1, wherein the one or more processors are further configured to:

tune the machine learning model using one or more hyperparameter sets, wherein the one or more hyperparameter sets include:

a penalty applied to a regression coefficient, a maximum depth of a decision tree, a number of features to evaluate, or a number of decision trees in an ensemble.

7. A method of clustering security vulnerabilities, comprising:

receiving, from a tracking system, a set of data structures representing a set of security vulnerabilities, wherein the set of data structures indicate a corresponding set of severity levels;

determining, based on mapping each compliance activity, in the set of compliance activities, to a corresponding sequence of events of a plurality of sequences of events included in one or more logs, a set of levels of effort corresponding to remediating the set of security vulnerabilities, wherein a similarity technique is used to determine the one or more logs that are associated with the set of security vulnerabilities;

providing the set of levels of effort to a machine learning model in order to generate a proposed change to a set of users, wherein the set of users are responsible for remediation of the set of security vulnerabilities;

outputting an indication of the proposed change to the set of users;

providing the corresponding set of severity levels and the set of levels of effort to the machine learning model in order to generate clusters for the set of security vulnerabilities;

receiving, from one or more repositories, over a network, individual skill information indicating expertises corresponding to each user in the set of users;

assigning, to each user in the set of users, based on the individual skill information and based on identifying clusters for the set of users, security vulnerabilities that are in a cluster, of the clusters for the set of security vulnerabilities, that is closest in a multi-dimensional encoding space to a cluster, of the clusters for the set of users;

outputting, based on the clusters for the set of security vulnerabilities, an indication of which users, in the set of users, are assigned to which security vulnerabilities in the set of security vulnerabilities; and transmitting, to the tracking system, a command to assign the set of data structures based on which users, in the set of users, are assigned to which security vulnerabilities in the set of security vulnerabilities.

8. The method of claim 7, wherein the indication of which users, in the set of users, are assigned to which security vulnerabilities, in the set of security vulnerabilities, is further based on mapping the clusters for the set of users to the clusters for the set of security vulnerabilities.

9. The method of claim 7, wherein the set of levels of effort comprise a set of amounts of time.

10. The method of claim 7, further comprising:

determining a corresponding set of due dates for the set of security vulnerabilities, wherein the corresponding set of due dates are provided to the machine learning model in order to generate the clusters for the set of security vulnerabilities.

11. The method of claim 7, further comprising:

receiving, from an administrator device, confirmation of which users, in the set of users, are assigned to which security vulnerabilities in the set of security vulnerabilities, wherein the command to assign the set of data structures is transmitted in response to the confirmation.

12. The method of claim 7, wherein the indication of the proposed change indicates a difference between expected man hours and actual man hours associated with remediating the set of security vulnerabilities.

13. The method of claim 7, further comprising:

tuning the machine learning model using one or more hyperparameter sets, wherein the one or more hyperparameter sets include:

a penalty applied to a regression coefficient, a maximum depth of a decision tree, a number of features to evaluate, or a number of decision trees in an ensemble.

14. A non-transitory computer-readable medium storing a set of instructions for clustering compliance activities, the set of instructions comprising:

one or more instructions that, when executed by one or more processors of a device, cause the device to:

receive, from a tracking system, a set of data structures representing a set of compliance activities, wherein the set of data structures indicate a corresponding set of due dates;

determine, based on mapping each compliance activity, in the set of compliance activities, to a corresponding sequence of events of a plurality of sequences of events included in one or more logs, a set of levels of effort corresponding to the set of compliance activities, wherein the device uses a similarity technique to determine the one or more logs that are associated with the set of compliance activities;

provide the set of levels of effort to a machine learning model in order to generate a proposed change to a set of users, wherein the set of users are responsible for the set of compliance activities;

output an indication of the proposed change to the set of users;

provide the corresponding set of due dates and the set of levels of effort to the machine learning model in order to generate clusters for the set of compliance activities;

receive, from one or more repositories, over a network, individual skill information indicating expertises corresponding to each user in the set of users;

assign, to each user in the set of users, based on the individual skill information, compliance activities that are in a cluster, of the clusters for the set of compliance activities, that is closest in a multi-dimensional encoding space to a cluster, of clusters for the set of users;

output, based on the clusters for the set of compliance activities, an indication of which users, in the set of users, are assigned to which compliance activities in the set of compliance activities; and transmit, to the tracking system, a command to assign the set of data structures based on which users, in the set of users, are assigned to which compliance activities in the set of compliance activities.

15. The non-transitory computer-readable medium of claim 14, wherein the one or more instructions, when executed by the one or more processors, further cause the device to:

classify the set of compliance activities to determine a corresponding set of severity levels, wherein the corresponding set of severity levels are provided to the machine learning model in order to generate the clusters for the set of compliance activities.

16. The non-transitory computer-readable medium of claim 14, wherein the one or more instructions, when executed by the one or more processors, further cause the device to:

train the machine learning model on unlabeled data, wherein the clusters for the set of compliance activities are unlabeled.

17. The non-transitory computer-readable medium of claim 14, wherein the one or more instructions, when executed by the one or more processors, further cause the device to:

train the machine learning model on labeled data, wherein the clusters for the set of compliance activities are labeled.

18. The non-transitory computer-readable medium of claim 14, wherein the one or more logs are associated with historical compliance activities, and wherein each compliance activity is associated with a corresponding level of effort, in the set of levels of effort, for the corresponding sequence of events.

19. The non-transitory computer-readable medium of claim 14, wherein the set of levels of effort comprise a set of amounts of time.

20. The non-transitory computer-readable medium of claim 14, wherein the indication of the proposed change indicates a difference between expected man hours and actual man hours associated with the set of compliance activities.

* * * * *